United States Patent
Ellis et al.

(10) Patent No.: US 7,152,979 B2
(45) Date of Patent: Dec. 26, 2006

(54) PROJECTOR WITH SEALED LIGHT VALVE

(75) Inventors: Jim W. Ellis, Kitchener (CA); Richard Matthews, Peterborough (CA); Lloyd F. Holland, Waterloo (CA); George P. Pinho, Waterloo (CA)

(73) Assignee: Christie Digital Systems, Inc., Ontario (CA)

( * ) Notice: Subject to any disclaimer, the term of this patent is extended or adjusted under 35 U.S.C. 154(b) by 98 days.

(21) Appl. No.: 10/640,652

(22) Filed: Aug. 14, 2003

(65) Prior Publication Data

US 2005/0122482 A1   Jun. 9, 2005

(51) Int. Cl.
*G03B 21/26* (2006.01)
*G03B 21/22* (2006.01)

(52) U.S. Cl. .................... 353/60; 353/61; 353/119

(58) Field of Classification Search ............ 353/31, 353/52, 57, 58, 60, 61, 119; 359/820
See application file for complete search history.

(56) References Cited

U.S. PATENT DOCUMENTS

| | | | | |
|---|---|---|---|---|
| 6,025,889 | A * | 2/2000 | Inoue ...................... | 349/5 |
| 6,231,191 | B1 * | 5/2001 | Shiraishi et al. ........... | 353/61 |
| 6,280,036 | B1 | 8/2001 | Suzuki ..................... | 353/31 |
| 6,350,033 | B1 | 2/2002 | Fujimori ................... | 353/61 |
| 6,394,608 | B1 | 5/2002 | Shiraishi et al. ........... | 353/57 |
| 6,572,231 | B1 * | 6/2003 | Watanabe .................. | 353/58 |
| 6,751,027 | B1 * | 6/2004 | Van Den Bossche et al. ...................... | 359/634 |
| 6,776,489 | B1 * | 8/2004 | Suzuki ..................... | 353/20 |
| 6,840,628 | B1 * | 1/2005 | Arai et al. ................ | 353/58 |
| 6,844,979 | B1 * | 1/2005 | Maki et al. ............... | 359/629 |
| 6,844,993 | B1 * | 1/2005 | Fujimori et al. ........... | 359/820 |
| 6,935,753 | B1 * | 8/2005 | Takezawa et al. .......... | 353/119 |
| 2002/0033992 | A1 | 3/2002 | Bossche et al. ............ | 359/634 |

OTHER PUBLICATIONS

"Merriam-Webster's Collegiate Dictionary, Tenth Edition", copyright 2001, p. 253.*
"Webster's II, New Riverside University Dictionary", copyright 1994, p. 674.*
PCT Written Opinion of the International Searching Authority dated Jan. 7, 2005 issued in International Application No. PCT/CA2004/001514 (5 pages).
PCT International Search Report dated Jan. 7, 2005 issued in International Application No. PCT/CA2004/001514 (3 pages).
Patent Abstracts of Japan for Publication No. 07152009 dated Jun. 16, 1995.
Communication enclosing a Supplementary European Search Report for the corresponding European Application No. 047616784.4 —2217 PCT/CA2004001514.

* cited by examiner

*Primary Examiner*—Melissa Jan Koval
(74) *Attorney, Agent, or Firm*—Staas & Halsey LLP

(57) ABSTRACT

A projector incorporating a prism and a plurality of light valves for modulating light that passes through the prism, wherein a dust-sealed airspace is provided between an imaging surface of each light valve and the prism for providing air channels to cool respective ones of the light valves.

14 Claims, 7 Drawing Sheets

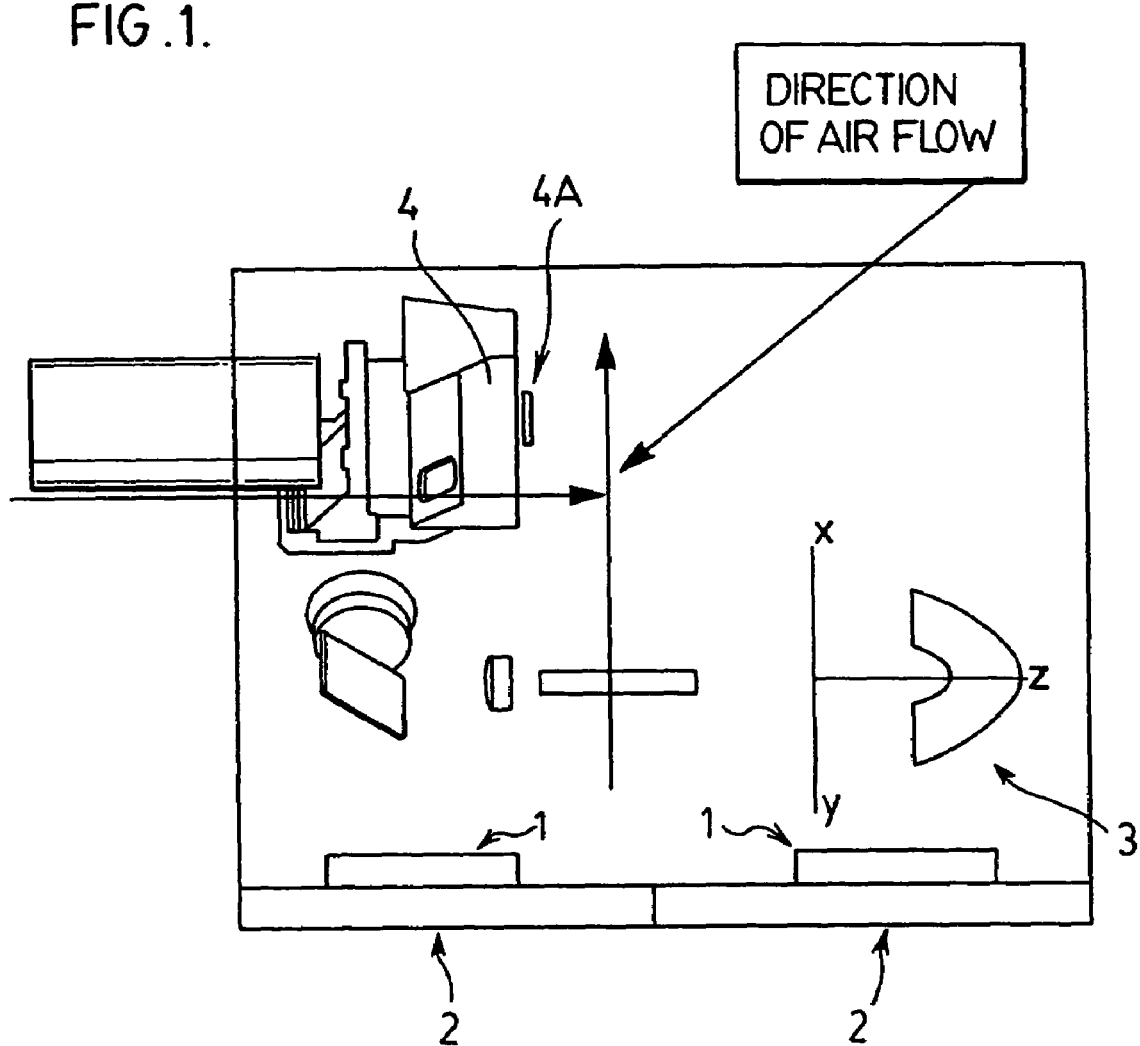

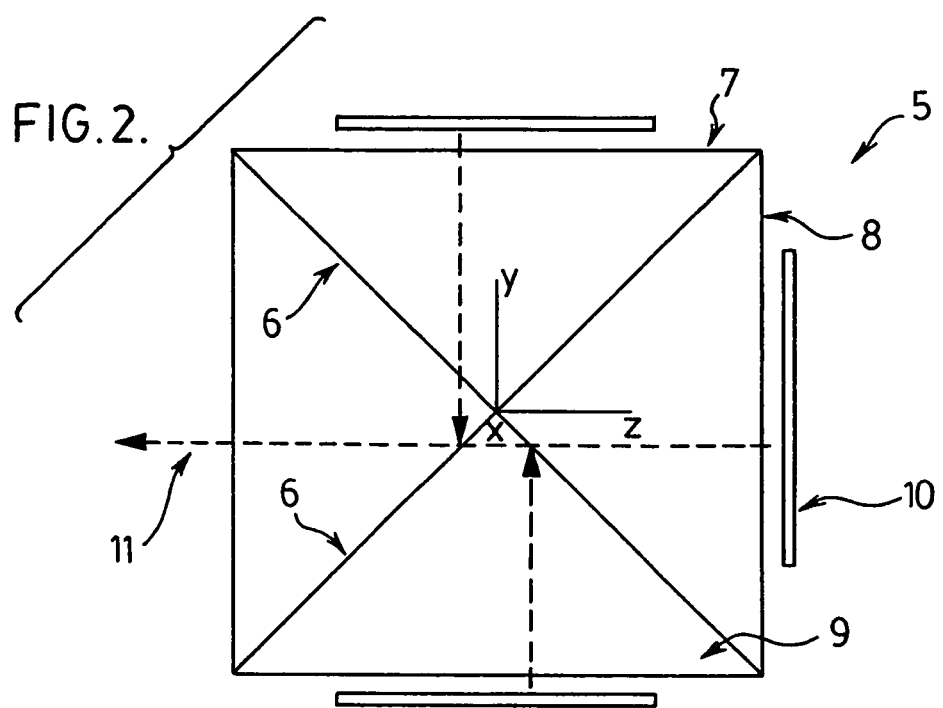
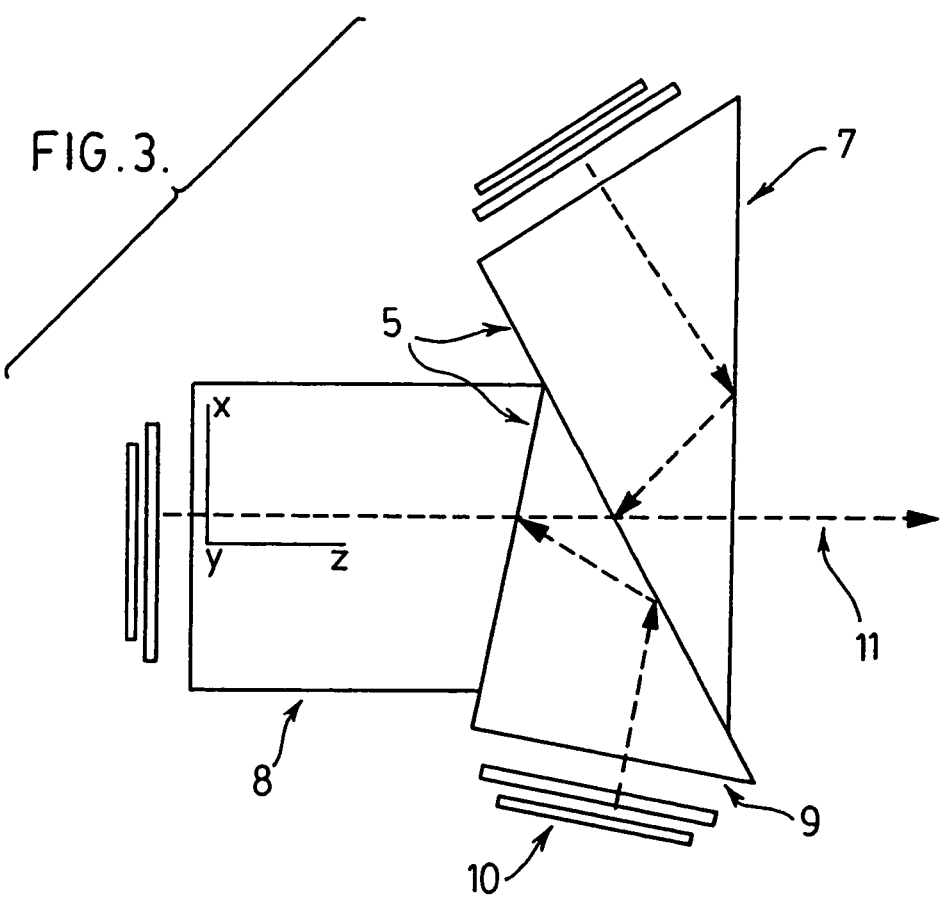

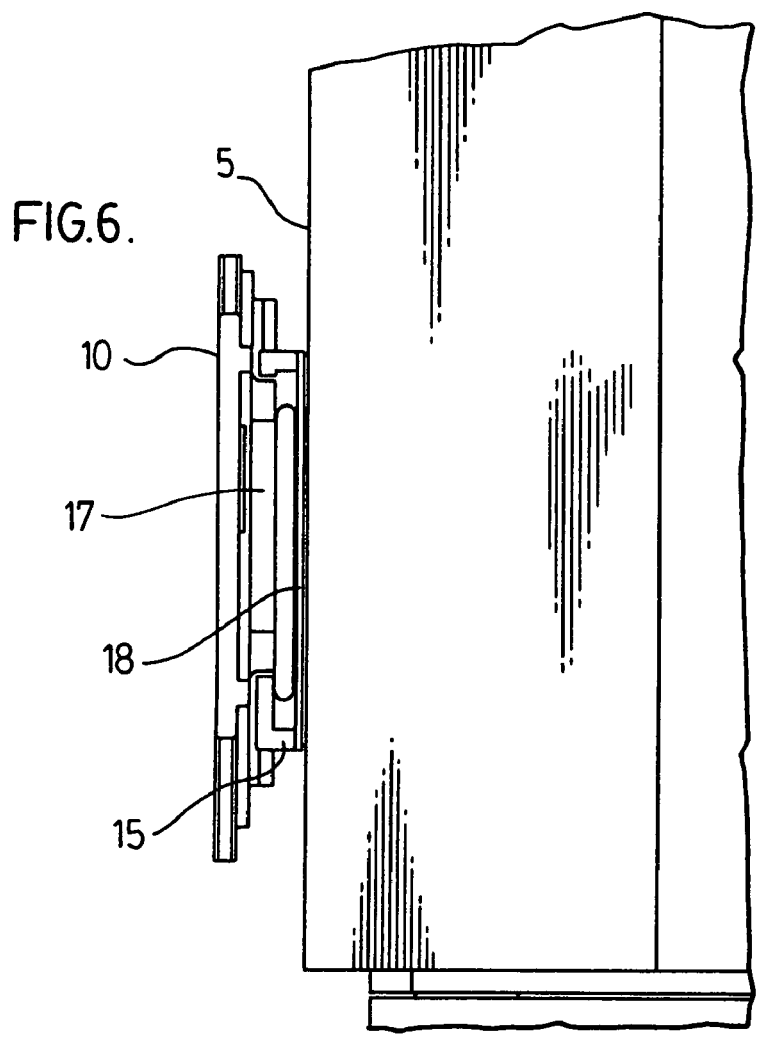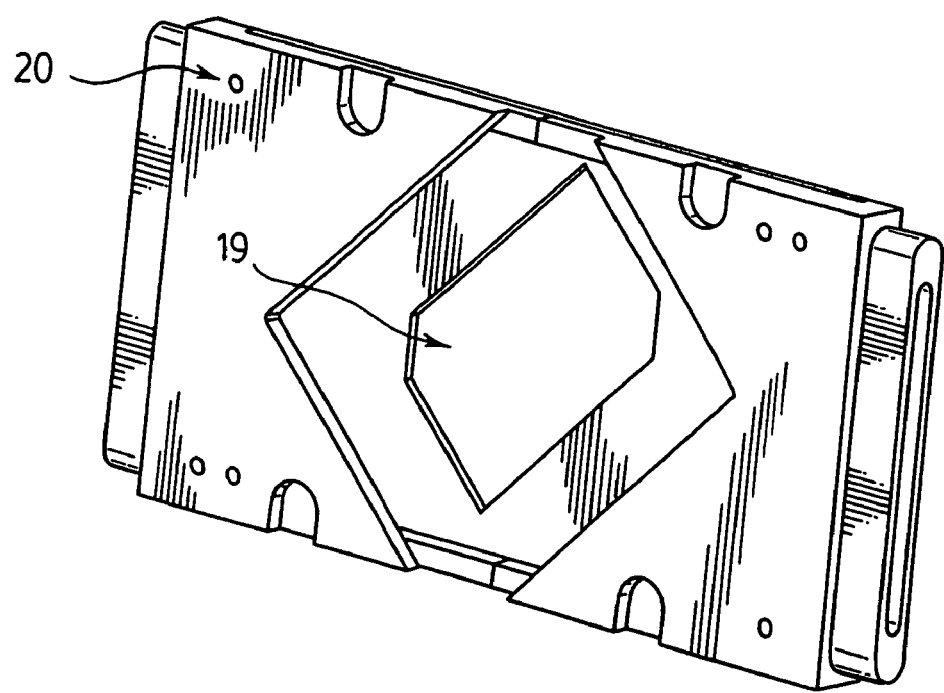

PROJECTOR WITH SEALED LIGHT VALVE

BACKGROUND OF THE INVENTION

1. Field of the Invention

The present invention is directed to LCD, LCOS, D-ILA or digital micromirror device (DMD) projectors incorporating light engines with color splitting-converging prisms, and more particularly to a projector with a light valve that is sealed against the glass prism surface by a dust-free air channel.

2. Description of the Related Art

In a typical color projector, a light valve is imaged onto a screen by a projection lens to produce an image. Dust that circulates through the projector by the air cooling system can settle on the light valve and also be imaged onto the image screen. The dust causes color blemishes and can reduce contrast in projectors capable of greater than 1500:1 contrast ratio.

A variety of techniques have been proposed for sealing dust out of a projector. U.S. Pat. No. 6,280,036 describes a method of mechanically sealing the light valve to a field lens in order to eliminate dust. U.S. Pat. No. 6,394,608 and US Patent Application 2002/0033992 A1 describe sealing the light valve and optical system inside a dust-proof box. A similar technique is proposed in U.S. Pat. No. 6,350,033. All of the foregoing prior art techniques are suitable for low-lumens applications (3000 lumens) and/or single chip projectors. In the case of three-chip projectors, the rated lumens can be from 6000 up to 20000 lumens. With such high-lumens output, air should be circulated around the light valves in order to maintain the manufacturer's temperature ratings. Also, three-chip projectors often have convergence adjustment on each of the red, green, and blue channels. Sealing the light valves in a dust sealed chamber therefore prevents convergence adjustment. Although it is common to dust seal the projector using various types of air filters, over time dust will enter the projector and eventually settle on the light valve surface.

Accordingly, it is an objective of the present invention to provide cooling and dust sealing to display devices mounted on a prism without limiting access for convergence adjustment on the display devices and maintaining display device temperatures within manufacturer's ratings.

SUMMARY OF THE INVENTION

Therefore, according to an aspect of the present invention a light valve sealing technique is set forth for a color projector that eliminates dust from the surface of the light valve but allows uninterrupted air cooling of the light valve surface. More particularly, a projection apparatus is set forth for displaying blemish free images on a display screen, wherein the light valve is sealed against the glass prism surface by a dust-free air channel. The channel prevents dust from entering the light valve imaging space and allows for clean air to be circulated in order to maintain adequate cooling of the light valve.

These together with other aspects and advantages that will be subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a cooling system for a dust sealed three-chip projector, according to the prior art FIG. 2 is a schematic representation of an x-cube used for LCD panel display devices, according to the prior Art.

FIG. 3 is a schematic representation of a plumbicon prism used for DMD panel display devices, according to the prior art.

FIG. 6 is a cross-sectional view through the display device and air channel of FIG. 5.

FIG. 7 is a perspective view of the air channel according to the present invention.

DETAILED DESCRIPTION OF THE PREFERRED EMBODIMENTS

Figure 4:
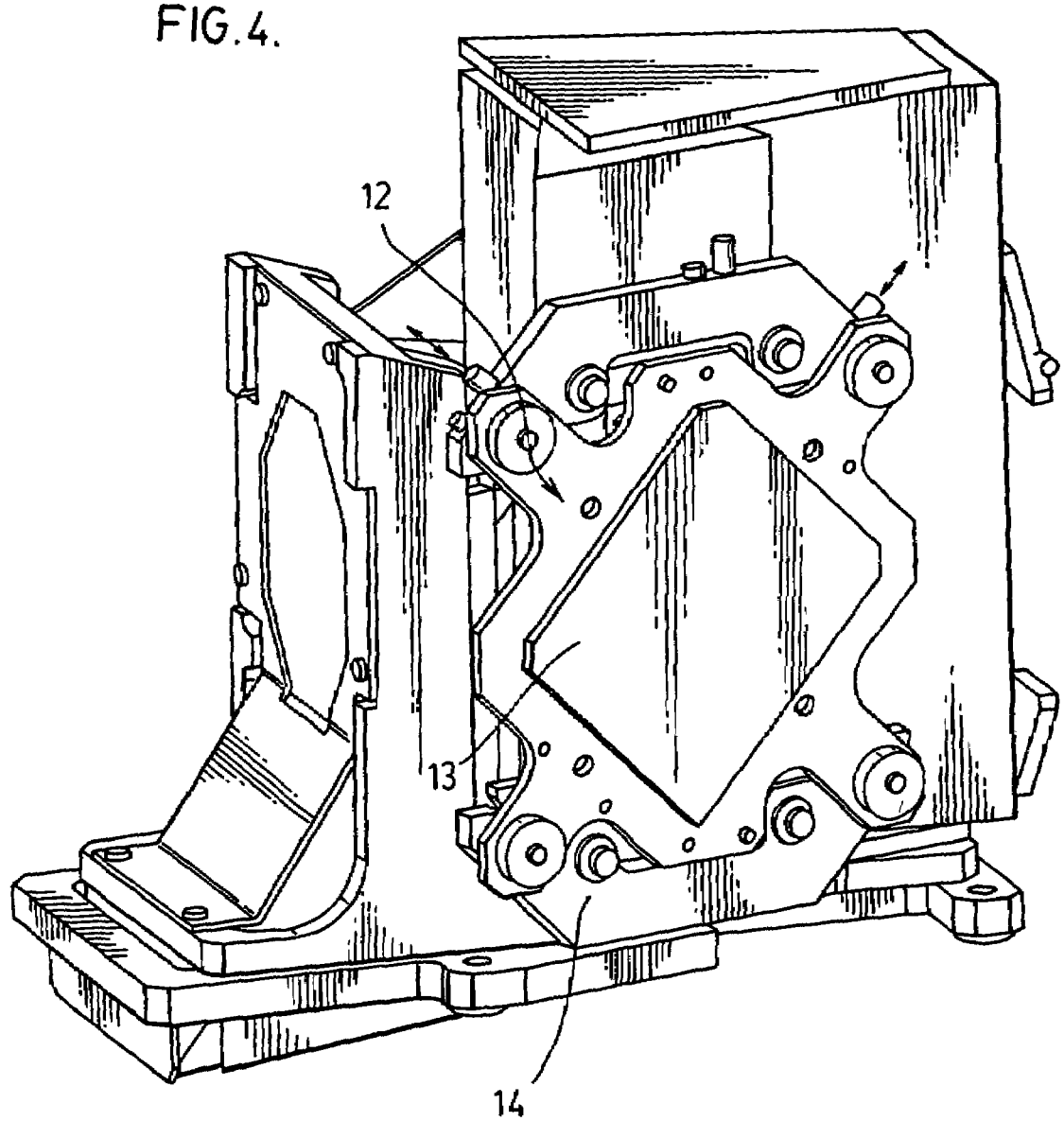
FIG. 4 is a perspective view of a display device with dust seal mounted to a prism, according to the present invention.

FIG. 1 shows a typical cooling design of a three-chip projector. Fans (1) are placed behind dust filters (2), which can be paper, foam, HEPA-type or other filters. The filtered air is circulated throughout the projector compartment using channels where necessary to direct air to critical areas such as lamp (3) and light engine (4) and light valve (4A). The circulated air is then expelled out of the projector via vents either on the front, back or sides.

The light valves on three-chip projectors are typically mounted to a color splitting-converging prism. Typical prism designs (5) use an x-cube for LCD panels and a plumbicon prism for DMD panels as shown in FIGS. 2 and 3, respectively. The prism elements contain dichroic coatings (6) to separate the incoming white light into red (7), green (8), and blue (9). Each color is then separately modulated at each display device or light valve (10). The terms "display device" and "light valve" are used interchangeably throughout this disclosure. The display devices reflect the modulated light, which is re-converged (11) by the prism and projected by a projection lens onto a screen to produce an image. In the three-chip design, convergence mechanisms are placed on the display devices to assist in field alignment in the event that the unit develops mis-convergence of color. In the past, this has prevented sealing the prism and chips, as a unit, against dust. Also, the necessity for air flow around the prism and the display devices limits the effectiveness of dust sealing the optical path.

According to the present invention, as shown in FIG. 4, the display device or light valve is mounted to the prism face using a support mechanism (12) that cradles the display device (13). The support mechanism also holds the convergence unit (14), which allows adjustment of the display device after it is secured to the support. An airspace is provided between the display device and the prism to allow airflow across the display device face.

Figure 5:
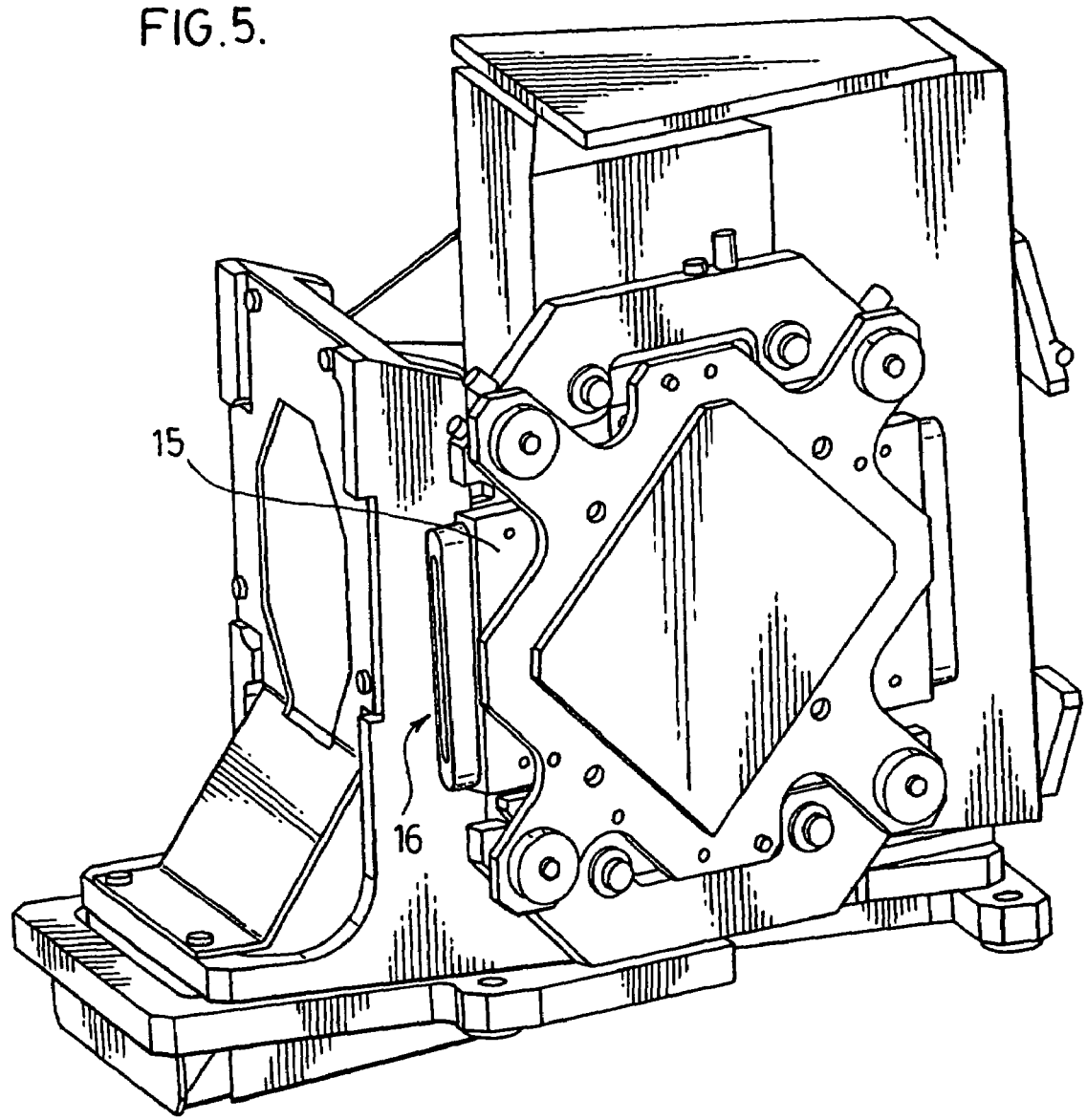
FIG. 5 shows the display device of FIG. 4 with an air channel for sealing the display device along top and bottom of the prism, according to the present invention.

An air channel (15) is inserted in the airspace, as shown in FIG. 5 for sealing the display device along the top and bottom sides against the prism face. The air channel is attached to the convergence mechanism support and covers the display device around the top and bottom sides. The sides (15) of the air channel are left open for airflow.

The cross-sectional view of FIG. 6 shows how the air channel fits into the airspace between the prism (5) and the display device (10). The display device sits flush with the inside surface (17) of the air channel. A gasket (18) is provided between the air channel and the prism face to seal the air channel against the prism and take up any spacing that may arise when the light valves are being positioned. The gasket (18) is typically made of flouroelastomer. Alternatively, the gasket may not be present, with the small gap and pressurization of the channel preventing dust from entering through the unsealed gap.

The air channel (15) has an opening on the opposite side against the prism to allow light to pass through to the display device (19), as shown in FIG. 7. Typically, this opening conforms to the shape of the light valve and is finished in black to absorb stray light that reduces contrast. FIG. 7 also shows the mounting points (20) which attach the air channel to the convergence mechanism on the light valve.

Each display device on a prism contains one of the above-described air channels (15). Various schemes for generating airflow through the air channels are possible. In one implementation (FIG. 8), a cooling assembly (21) is connected inside the projector to a a plurality of air ducts (22). The assembly (21) comprises an air filter (32), a fan (33) and a manifold (34). The ducts (22) are connected to one side of each of the three air channels (15) and air is circulated though each duct and expelled at the exit side (23) of the air channel. During operation, the airflow inside the air channels becomes at least partially laminar such that dust in the projector or air channel passes by the display device without attaching to the display device surface. The rate of airflow is controlled by fan speed of manifold constriction and depends on the amount of surface cooling required at the display device surface. To prevent dust in the projector from entering the display surface area when the fan is turned off, the exit sides (23) of the air channels are sealed with a filter. The cooling system of the present invention reduces the amount of dust in the air channels, but does not completely seal dust out of the light valve. Instead, it relies on the airflow (laminar or partially laminar) to prevent the settling of dust on the light valve.

The cross-sectional area of the air channel (15) shown in FIG. 6 remains constant from one side to the other and is interrupted only by the display device surface in the center of the air channel. The length of the air channel is three times the long dimension of cross-sectional area to ensure laminar airflow through the air channel. The laminar airflow provides for cooling of the display device and prevents dust from settling on the display device. The air channel attaches to the convergence mechanisms and therefore moves directly with convergence while ensuring a sealed fit between the display device and the air channel.

Figure 9:
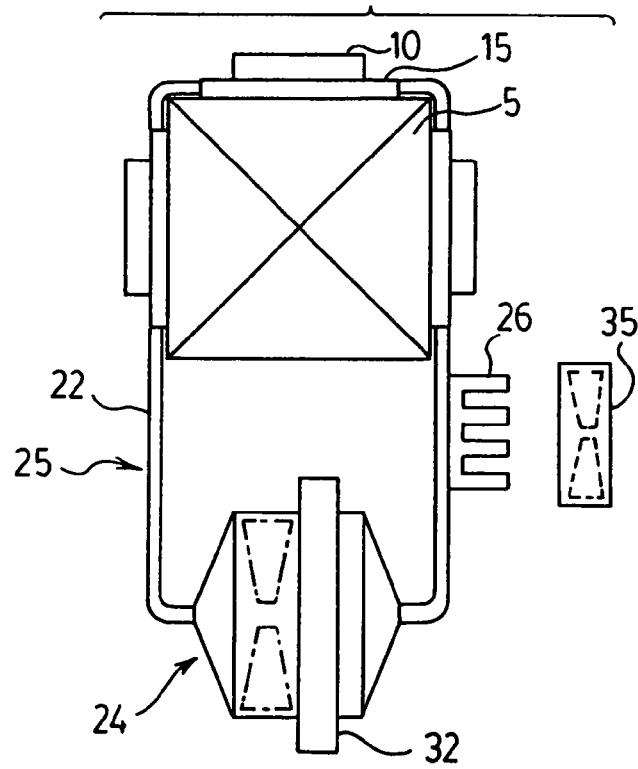
FIG. 9 is a schematic representation of a cooling system for the display device of FIGS. 4–7, according to an alternative embodiment.

In another embodiment, the three air ducts (22) are connected in series to a fan (24) to form a closed air circuit (25), as shown in FIG. 9. The input manifold at the fan directs air to the input side of one of the air channels. As the air circulates through the air channels and light valves, and is returned to the fan, it carries heat away from the display devices but also becomes heated. Accordingly, a heat sink (26) is provided with a small fan (35) to cool the air as it passes. The heat sink may also be an air-to-air heat exchanger or air-to-water heat exchanger. This allows a completely closed dust free air circuit to be formed around each light valve and still maintain temperatures within manufacturer's specification.

Figure 8:
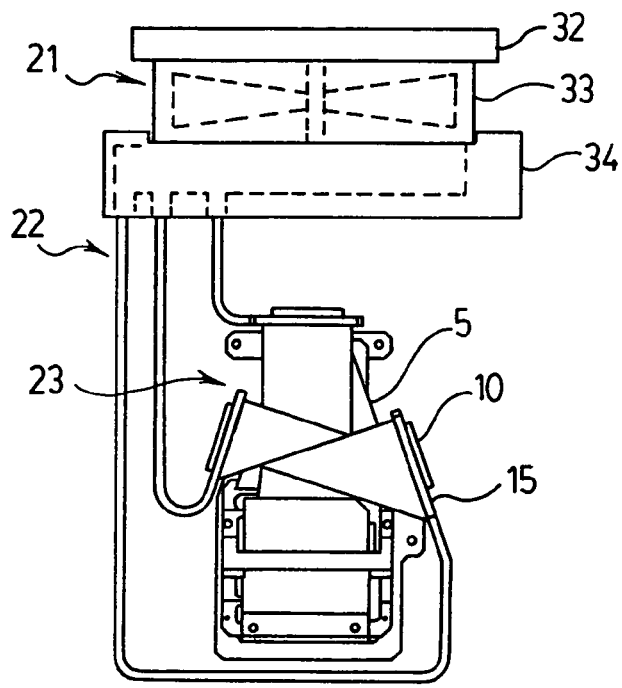
FIG. 8 is a schematic representation of a cooling system for the display device of FIGS. 4–7.

Both cooling systems of FIGS. 8 and 9 have been shown in the effective at sealing dust and cooling the light valve. In a typical example, using Texas Instruments DMD's and a plumbicon prism laminar airflow through the air channels at 1.5 CFM, the DMD temperature was reduced by 8° C. Fine grain powder with average size range of 0.3–5 microns blown onto the prism and exterior of the DMD and air channel resulted in no significant intrusion of dust onto the DMD window. Dust within the air channel also did not settle on the window in any significance that would degrade the image quality.

Figure 10:
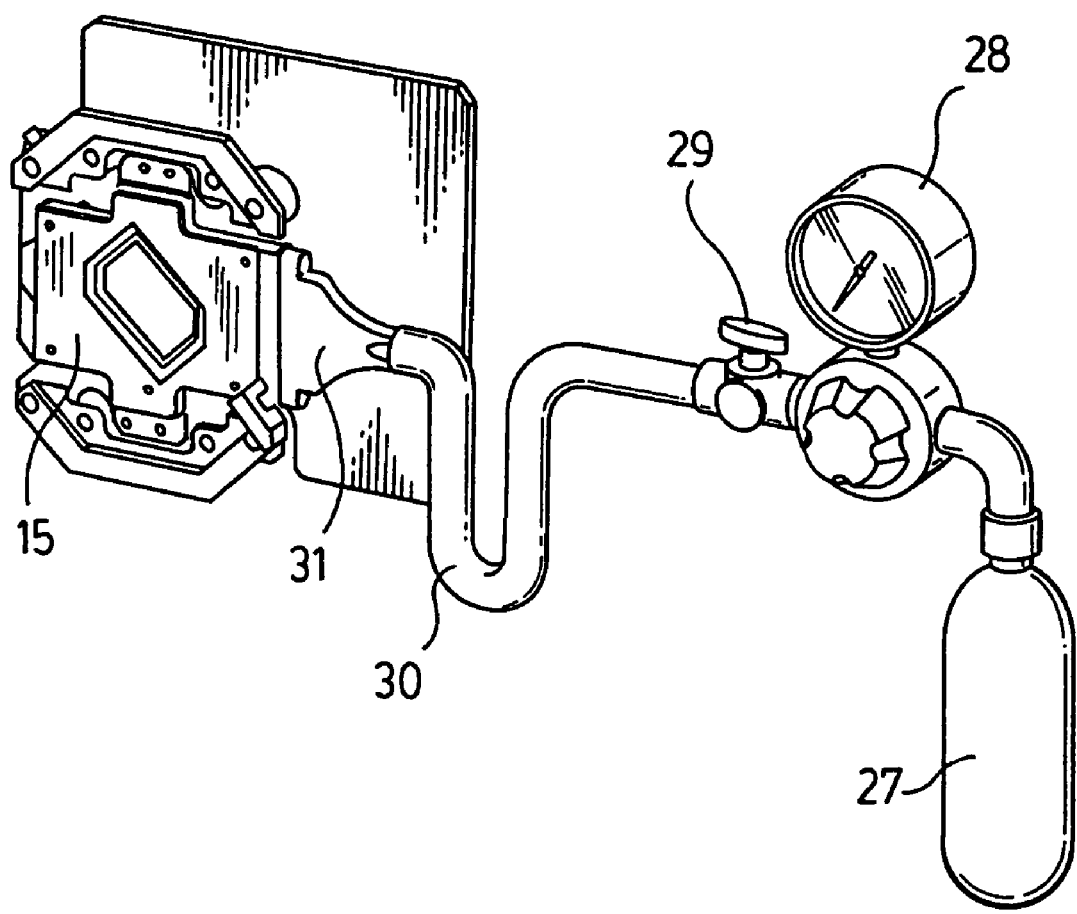
FIG. 10 is a perspective view of an air channel dust purging system, according to a further aspect of the present invention.

According to a further embodiment, a variable speed fan was connected to appropriate control software in the projector for increasing the fan speed to generate turbulent air flow in the air channels. This can be used to purge dust trapped in the air channels or dust that has settled on the light valves during shipment or operation of the projector. A software timer can automatically set the control of the fan or it can be user-activated. A further embodiment is contemplated in which an adapter connects the air channels to an external clean, pressurized gas canister for forcing high pressure gas through the channels, thereby removing any dust that may have settled inside. A preferred method for such a dust-purging embodiment is shown in FIG. 10. A cylinder (27) contains a compressed gas such nitrogen, CO2 of air. The pressure of the compressed gas delivered to the air channel is controlled using a regulator (28) and a shut-off valve (29). Connection to the air channel (15) is achieved with flexible tubing (30) and an adapter (31). During use, the gas pressure is preset using the regulator (28), then the operator disconnects the existing airflow delivery system, connects the dust purging device and purges the air channels by opening the shut-off valve (29). The embodiment described above is a portable system for use in the field. Other embodiments are contemplated, such as using a permanent compressed gas line or air pump to deliver the compressed gas. Also, a system can be designed to achieve the dust purging without having to disconnect the existing air delivery system. Another contemplated alternative system uses a vacuum configuration to suction the dust from the air channel (15).

The many features and advantages of the Invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A projector incorporating a prism and a light valve for modulating light that passes though said prism, the improvement comprising:

an air channel provided between an imaging surface of said light valve and said prism, wherein said light valve is mounted by a support mechanism and defining said air channel between the light valve and the prism, sides of the air channel being open for airflow to cool and minimize dust from the air channel settling on said light valve.

wherein the light valve sits flush with the inside surface of the air channel and said air channel is of uniform cross-sectional area and sufficient length relative to said imaging surface to provide at least partially laminar airflow between the prism and the imaging surface of the light valve.

2. A projector incorporating a prism and a light valve for modulating light that passes though said prism, the improvement comprising:

an air channel provided between an imaging surface of said light valve and said prism, wherein said light valve is mounted by a support mechanism and defining said air channel between the light valve and the prism, sides of the air channel being open for airflow to cool and minimize dust from the air channel settling on said light valve, wherein said air channel is attached to said light valve by means of said support mechanism so as to permit convergence adjustment.

3. A projector incorporating a prism and a light valve for modulating light that passes though said prism, the improvement comprising:

an air channel provided between an imaging surface of said light valve and said prism, wherein said light valve is mounted by a support mechanism and defining said air channel between the light valve and the prism, sides of the air channel being open for airflow to cool and minimize dust from the air channel settling on said light valve; and a gasket for sealing the air channel against the prism.

4. A projector incorporating a prism and a plurality of light valves for modulating light that passes though said prism, the improvement comprising:

air channels provided between an imaging surface of each said light valve and said prism, wherein said light valves are mounted by a support mechanism and defining said air channels between the light valves and the prism, sides of each of the air channels being open for airflow to cool and minimize dust from the air channel settling on respective ones of said light valves; and a fan, a manifold connected to said fan, and a plurality of ducts connected between respective ports of said manifold and respective ones of said air channels for blowing air through said respective air channels to cool said light valves.

5. The projector according to claim 4 further comprising a filter adjacent the fan to reduce dust in said air channels.

6. The projector according to claim 4 further comprising a filter capped to at least one end of each of said air channels to prevent dust from re-entering said respective light valves when the fan is switched off.

7. The projector according to claim 4 further comprising means for increasing the speed of said fan to generate turbulent air flow in said air channels for purging dust that has settled on the light valves.

8. A projector incorporating a prism and a plurality of light valves for modulating light that passes though said prism, the improvement comprising:

air channels provided between an imaging surface of each said light valve and said prism, wherein said light valves are mounted by a support mechanism and defining said air channels between the light valves and the prism, sides of each of the air channels being open for airflow to cool and minimize dust from the air channel settling on respective ones of said light valves, wherein said air channels are connected in series with a fan to form a closed loop air circulation system.

9. The projector in claim 8 further comprising a heat sink adjacent said fan for radiating heat collected by said air circulation system.

10. The projector of claim 9 further comprising an additional fan for cooling said heat sink.

11. The projector according to claim 9 wherein said heat sink is an air-to-air heat exchanger.

12. The projector according to claim 9 wherein said heat sink is an air-to-water heat exchanger.

13. The projector according to claim 8 further comprising means for increasing the speed of said fan to generate turbulent air flow in said air channels for purging dust that has settled on the light valves.

14. A projector incorporating a prism and a plurality of light valves for modulating light that passes though said prism, the improvement comprising:

air channels provided between an imaging surface of each said light valve and said prism, wherein said light valves are mounted by a support mechanism and defining said air channels between the light valves and the prism, sides of each of the air channels being open for airflow to cool and minimize dust from the air channel settling on respective ones of said light valves, wherein said air channels are connected in series with an external pressurized source of clean gas air for purging said dust.

* * * * *

UNITED STATES PATENT AND TRADEMARK OFFICE
CERTIFICATE OF CORRECTION

PATENT NO. : 7,152,979 B2 Page 1 of 1
APPLICATION NO. : 10/640652
DATED : December 26, 2006
INVENTOR(S) : Jim W. Ellis et al.

It is certified that error appears in the above-identified patent and that said Letters Patent is hereby corrected as shown below:

First Page, Column 2 (Abstract), Line 2, change "through" to --though--.

Column 4, Line 67, after "valve" change "." to --,--.

Signed and Sealed this

First Day of May, 2007

JON W. DUDAS
*Director of the United States Patent and Trademark Office*